(12) United States Patent
Klein et al.

(10) Patent No.: US 9,734,088 B2
(45) Date of Patent: *Aug. 15, 2017

(54) MEMORY MANAGEMENT UNIT AND METHOD FOR ACCESSING DATA

(71) Applicant: International Business Machines Corporation, Armonk, NY (US)

(72) Inventors: Matthias Klein, Wappingers Falls, NY (US); Marco Kraemer, Sindelfingen (DE); Carsten Otte, Stuttgart (DE); Christoph Raisch, Gerlingen (DE)

(73) Assignee: International Business Machines Corporation, Armonk, NY (US)

(*) Notice: Subject to any disclaimer, the term of this patent is extended or adjusted under 35 U.S.C. 154(b) by 79 days.

This patent is subject to a terminal disclaimer.

(21) Appl. No.: 14/824,107

(22) Filed: Aug. 12, 2015

(65) Prior Publication Data

US 2017/0046276 A1 Feb. 16, 2017

(51) Int. Cl.
*G06F 12/08* (2016.01)
*G06F 12/122* (2016.01)
*G06F 12/1009* (2016.01)
*G06F 12/14* (2006.01)

(52) U.S. Cl.
CPC ........ *G06F 12/122* (2013.01); *G06F 12/1009* (2013.01); *G06F 12/1425* (2013.01); *G06F 12/1466* (2013.01); *G06F 12/1483* (2013.01); *G06F 2212/1052* (2013.01); *G06F 2212/621* (2013.01); *G06F 2212/657* (2013.01); *G06F 2212/69* (2013.01)

(58) Field of Classification Search
CPC ............... G06F 12/122; G06F 12/1009; G06F 2212/657; G06F 12/69
USPC .......................................... 711/160, 206, 207
See application file for complete search history.

(56) References Cited

U.S. PATENT DOCUMENTS 7,467,381 B2 * 12/2008 Madukkarumukumana G06F 9/5077
710/200
8,225,071 B2 7/2012 Chen et al.
8,549,211 B2 10/2013 Anvin
(Continued)

OTHER PUBLICATIONS

IBM: List of IBM Patents or Patent Applications Treated As Related (Appendix P), Nov. 3, 2015, 2 pages.
(Continued)

*Primary Examiner* — Gary Portka
(74) *Attorney, Agent, or Firm* — Minh-hien Vo (57) ABSTRACT

A method for accessing data blocks stored in a computer system. The method may include hardware components for controlling access to a memory unit of the computer system. The memory unit includes a page table and an operating system, where each data block of the data blocks is accessed via a virtual address. The method further includes: adding an entry in the page table for each data block of a first set of the data blocks, the page table represents the virtual address; checking that a first entry of the added entries represents a first virtual address, in response to receiving a request of a first data block via the first virtual address by a memory management unit of the computer system; and obtaining a first physical address of the first data block from the hardware components, and the added entry is provided without indication of the first physical address.

13 Claims, 6 Drawing Sheets

(56) References Cited

U.S. PATENT DOCUMENTS

| | | |
|---|---|---|
| 8,806,146 B2 | 8/2014 | Ito et al. |
| 2006/0230252 A1* | 10/2006 | Dombrowski ...... G06F 12/1027 711/205 |
| 2015/0081983 A1 | 3/2015 | Ries et al. |
| 2015/0082000 A1 | 3/2015 | Hong et al. |
| 2015/0199273 A1 | 7/2015 | Klein et al. |
| 2015/0199274 A1 | 7/2015 | Klein et al. |

OTHER PUBLICATIONS

Pending U.S. Appl. No. 14/929,454, filed Nov. 2, 2015, entitled: "Memory Management Unit and Method for Accessing Data", 34 pages.

Ammendola et al., "ASIP acceleration for virtual-to-physical address translation on RDMA-enabled FPGA-based network interfaces", Article in Press, Future Generation Computer Systems, Elsevier B.V., 2015, pp. 1-10.

Ahn et al., "Revisiting Hardware-Assisted Page Walks for Virtualized Systems", Newsletter ACM SIGARCH Computer Architecture News—ISCA '12 vol. 40 Issue 3, Jun. 2012, pp. 476-487.

\* cited by examiner

MEMORY MANAGEMENT UNIT AND METHOD FOR ACCESSING DATA

BACKGROUND

The present invention relates to the field of digital computer systems, and more specifically, to a method for accessing data blocks stored in a computer system.

Recent technology improvements lead to significantly wider input output (I/O) bandwidth for memory or I/O cards. This fact changes the overall picture in a processor architecture with respect to bottle necks. Processor speed does not scale with I/O speed improvements from one generation to the next. This points to a new bottle neck in the memory management area, namely software algorithms that drive I/O: network stack, block device layer, virtual memory paging algorithms.

SUMMARY

Various embodiments provide a method for accessing data blocks stored in a computer system, memory management unit, computer program product and computer system as described by the subject matter of the independent claims. Advantageous embodiments are described in the dependent claims. Embodiments of the present invention can be freely combined with each other if they are not mutually exclusive.

According to an embodiment of the present invention, a method for accessing data blocks stored in a computer system is described, the computer system comprising hardware and firmware components for controlling access to a memory unit of the computer system, the memory unit comprising a page table and an operating system or a hypervisor, wherein each data block of the data blocks is accessed via a virtual address. The method comprises: for each data block of at least a first set of the data blocks adding, by the operating system or the hypervisor, an entry in the page table that represents the virtual address of the data block; in response to receiving a request of a first data block via a first virtual address by a memory management unit, MMU, of the computer system, checking (or determining) that a first entry of the added entries represents the first virtual address; and obtaining by the MMU a first physical address of the first data block from one of the hardware and firmware components, wherein the added entry (of each data block of the first set of the data blocks) is provided without indication of the first physical address.

According to an embodiment of the present invention, a memory management unit, MMU, for controlling the conversion of a virtual address of requested data block into a physical address of said requested data block using a page table stored in a memory is described, wherein the page table comprises at least one entry without indication of a physical address. The MMU is configured for: in response to receiving a request of a first data block via a first virtual address, determining that a first entry of the at least one entry corresponds to the first virtual address; and instructing one of the hardware and firmware components to provide a first physical address of the first data block.

According to an embodiment of the present invention, a computer system comprising a MMU of preceding embodiment and an operating system or hypervisor is described, wherein the operating system or hypervisor is configured to: for a data block to be stored in a memory of the computer system add an entry in the page table that represents the virtual address of the data block, wherein the entry is provided without indication of a physical address of the data block.

According to an embodiment of the present invention, a computer program product is described, the computer program product comprising a computer readable storage medium having program instructions embodied therewith, the program instructions executable by a processor to cause the processor to create for a data block an entry in a page table that represents a virtual address of the data block, wherein the added entry is provided without indication a physical address of the data block.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In conventional computer systems, virtual memory address-to-physical address translations are typically stored in page table entries of a page table. Each page table entry has a page table entry address. The translations are provided by an operating system. For example, when a process requests access to a data block in memory, it is the responsibility of the operating system to map the virtual address provided by the process to the physical address of the actual memory where that data block is stored.

In an embodiment, a shortcut of the time consuming address translation activities is made such that the operating system (OS) is not used to retrieve or generate the physical address, but rather or in addition, the OS is configured to create an entry having a different structure without indication of the physical address as described below. This is moving away time consuming operating system involvement towards I/O attached devices i.e. memory and I/O cards.

The present method may have the advantage of reducing the access latency or time to data in the memory unit especially for systems having multi-level page tables. This is because the time required by the OS to generate the physical address is higher than the time required by the hardware or firmware component to generate the same physical address. The access time is the time required between the request made for a read or write operation and the time the data block is made available or written at the requested location.

Another advantage may be that the present method may allow operating legacy codes transparently by maintaining at least part of well-known address translation behaviors. But in case a new special mode is detected by using the new added entries a new meaning gets assigned to the respective page table entry. All the address translation related activities are then managed by hardware or firmware components as they should have better knowledge on what to fill in next into the memory unit of the computer system.

The term "data block", as used herein, refers to a collection of bytes stored in a storage block. Each data block corresponds to a specific number of bytes of physical space on disk or memory. For example, a data block may include data segments of 4 kilobytes (kB) on disk, and when data needs to be moved from disk to memory, the entire data block is moved. For example, the data block may comprise a memory page.

The term "virtual address", as used herein, includes an address referred to as a logical or a linear address that is a non-physical address in a virtual address space defined by software, a processor, or a user process. Depending on the implementation, a virtual address space may or may not be scattered in memory.

As used herein the term "physical address" or "absolute address" refers to an address that is used to retrieve the contents of a physical memory. A "physical address space" is a space of physical addresses.

According to one embodiment, the page table further comprises entries indicating physical addresses of a second set of the data blocks, the method further comprising: marking each of the added entries as an entry having no indication of a physical address. For example, the added entry may be marked by setting one or more bits of the added entry to one or more predefined values. The data blocks may consist of the first and second set of data blocks.

In one example, the first set of data blocks may comprise a number of data blocks that is smaller, higher or equal to the number of data blocks in the second set of data blocks.

According to one embodiment, a data block of the first set of data blocks may be requested in a predefined time period, i.e. an entry may be added in the page table without indication of the physical address for a data block that is requested in the predefined time period.

According to another embodiment, a data block of the first set of data blocks is provided with storage characteristics that are different from the storage characteristics of a data block of the second set of data blocks. For example, the first set of data blocks may be accessed using a first access mode that is different from a second access mode of the second set of data blocks.

This embodiment may have the advantage that the present method may be seamlessly integrated with the existing systems without undue burden. Further, the present method introduces changes that may be transparent as the computer system after change adheres to previous external interface while changing its internal behavior.

According to one embodiment, the added entry (of each data block of the first set of the data blocks) indicates at least one of (referred to as entry attributes): the added entry is a valid or invalid entry; the one of the hardware and firmware components; a read only data block; storage characteristics for storing the data block, the storage characteristics comprise at least one of storage technology for storing the data block, copy on write option, read/write/execute permissions, locking in the memory unit.

For example, the added entry may comprise multiple indicators each associated with the above listed entry attributes. For that, the added entry may be provided with a plurality of hardware or firmware control data structures (e.g. bits) that represent the indicators. For example, an indicator of the indicators may have a combination of one or more values of one or more bits of the added entry. The values of the bits may be provided by the one of the hardware and firmware components or by the operating system.

This embodiment may provide a page table entry that contains enough information to provide the physical address in accordance with the present disclosure. For example, a same page table entry of the present method may be used for multiple virtual addresses, which may thus save resources (e.g. storage resources). The one of the hardware and firmware components may use a given virtual address and the added entry associated with the given virtual address in order to generate the physical address that is associated with the given virtual address.

The added entry may have a simple internal structure compared to existing entries and may thus be easily discovered by the one of the hardware and firmware components.

According to one embodiment, adding the entry comprises: sending by the operating system a request to the hardware and/or firmware component indicating storage characteristics of the respective data block; adding the entry upon receiving an acknowledgment from the hardware or firmware component, wherein the added entry (of each data block of the first set of the data blocks) comprises information provided by the sender of the acknowledgment. The entry is created using the received information. This embodiment may be referred to as a negotiation embodiment or method.

The indicated storage characteristics may comprise at least part of the entry attributes described above. The added entry comprises information on the sender of the acknowledgment and/or the requested storage characteristics. This information may be used to create or add the entry.

For example, the negotiation may be performed at once for at least part of the entry attributes described above. In case the negotiation is performed at once for all entry attributes, a single acknowledgment may be received and may be sufficient to add the entry in accordance with the negotiated entry attributes. For example, the OS may request (the one of hardware and firmware components) which read/write/execute permissions can be used for the requested data block and whether the added entry is a valid or invalid entry for the requested data block. The acknowledgment may comprise values of indicators that are associated with both entry attributes, namely, "read/write/execute permissions" and "valid or invalid entry". In this example, the two entry attributes may be sufficient to create the entry for the requested data block.

In another example, the negotiation may be performed for each attribute of the entry attributes. In this example, the entry may be added only when all the acknowledgments are received.

In a further example, the one of the hardware and firmware components may send a rejection to the received request. In this case, the entry may not be added. In another example, in case of receiving a rejection the operating system may send a further request for requesting other entry attributes. The other entry attributes may or may not comprise part of the rejected entry attributes.

Further, since the access time depends on the physical characteristics and access mode used for the memory unit in order to access data blocks, the present method may provide a controlled method for controlling the access time e.g. by choosing the characteristics e.g. type of storage that may reduce the access time.

Still further, this embodiment may enable the one of the hardware and firmware components to have a full control of the (content of) entry addition or creation compared to the method where the OS can define or propose the content of the entry to be added as described below.

According to one embodiment, the one of the hardware and firmware components comprises the sender of the acknowledgment. If one of the hardware or firmware components answered positively after negotiation, it will be used for requesting a given physical address later on once a process requests the virtual address that corresponds to that given physical address. This may save time that would otherwise be required for sending two requests in case one of the hardware or firmware components has no control access to the requested data block. For example, if the hardware component has no control access to the data block the MMU has to send again the instruction (that has already sent to the hardware component) to the firmware component to request the physical address of the data block. This may be prevented by the present method.

According to one embodiment, adding the entry comprises: registering by the operating system with the hardware and/or firmware components the entry to be added, wherein the registration indicates storage characteristics of the respective data block; adding the entry upon receiving a confirmation from the hardware or firmware component. The registering of the entry comprises registering values of at least part of bits forming the entry. This embodiment may have the advantages as described above with reference to the negotiation embodiment. Further, this embodiment may provide an alternative method for defining the content of the added entry at the operating system instead of the hardware or firmware components.

According to one embodiment, the added entry (of each data block of the first set of the data blocks) comprises information indicating the entry as a valid or invalid entry, wherein the obtaining of the first physical address is performed if the first entry is a valid entry.

According to an embodiment, a 1-bit "valid bit" may be used to indicate that the entry is a valid or invalid entry. If the valid bit is set (to 1), the requested data block is in the memory unit. The valid bit may be set to either a "1" value to indicate a valid entry, or a "0" value to indicate an invalid entry. Qualifying a 1-bit valid bit instead of a (multi-) valid bit may preserve processor resource and improve performance.

According to one embodiment, the added entry (of each data block of the first set of the data blocks) comprises information indicating hardware or firmware components, wherein the obtaining of the first physical address comprises reading the information for determining the one of the hardware and firmware components from which the first physical address is to be obtained.

According to an embodiment, a 1-bit "HW/FW bit" may be used to indicate the hardware or firmware component. The HW/FW bit may be set to either a "1" value to indicate hardware component, or a "0" value to indicate a firmware component. Qualifying a HW/FW bit may preserve processor resource and improve performance compared to a case where the source of the first physical address is unknown.

According to one embodiment, the method further comprises in case the first entry is an invalid entry, controlling a page fault handler of the operating system to fill the page table with a new entry or to mark the first entry as a valid entry.

According to one embodiment, the MMU comprises a translation lookaside buffer, TLB, wherein the receiving of the request further comprises: detecting a TLB miss for the requested first virtual address. The obtaining of the first physical address is only performed if the TLB miss is detected. This embodiment may be advantageous at it may be seamlessly integrated in the existing systems having a TLB implemented feature. Further, this embodiment may save resources that would otherwise be required in case the obtaining of the first physical address is also performed for TLB hits.

According to one embodiment, the obtaining of the first physical address comprises: instructing by the MMU the one of the hardware and firmware components to provide the first physical address; creating by the one of the hardware and firmware components an entry in the TLB indicating the first virtual address and the first physical address.

According to one embodiment, the method further comprises: in response to determining that a given entry of the added entries is a least recently used (LRU) entry unregistering the given entry using the one of the hardware and firmware components.

According to one embodiment, the method further comprises determining usage frequency of a given entry of the added entries, in case the usage frequency is smaller than a predefined threshold unregistering the given entry using the one of the hardware and firmware components.

By unregistering the LRU entries, other entries may be inserted instead in the page table. The additional entries may be more frequently accessed. This may have the advantage of improving performances and data access efficiency of the present method.

According to one embodiment, the unregistering comprising flushing the TLB by the one of the hardware and firmware components or the operating system. An advantage of flushing the TLB is that the TLB can be kept smaller, which minimizes the time required to search the array.

According to one embodiment, the method further comprises in response to receiving by the MMU a request of a second data block via a second virtual address, determining that a second entry of the entries corresponds to the second virtual address, the second entry comprising a second physical address of the second data block, and using the second physical address for accessing the second data block. This embodiment may have the advantage to be seamlessly integrated in the existing systems having entries encoded with a structure different from the structure of the added entry (of each data block of the first set of the data blocks).

According to one embodiment, the execution of the program instruction further causes the processor to add entries in the page table, wherein entries comprise information indicating physical addresses.

Figure 1:
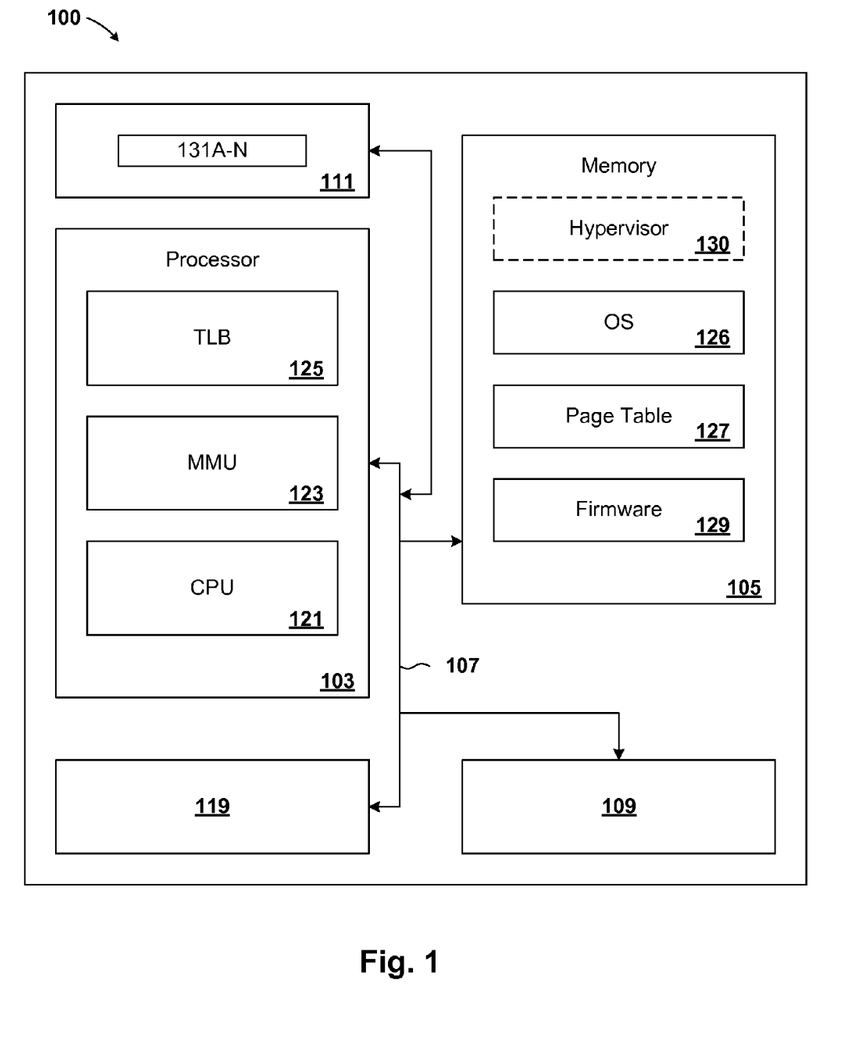
FIG. 1 depicts a functional block diagram illustrating a data processing system, according to an exemplary embodiment.

Referring now to FIG. 1, a functional block diagram illustrating a data processing system or computer system 100 is provided, according to an example embodiment of the present invention. The data processing system 100 may, for example, comprise an IBM power system.

The components of data processing system 100 may include, but are not limited to, one or more processors or processing units 103, a storage system 111, a memory unit 105, and a bus 107 that couples various system components including memory unit 105 to processor 103. Storage system 111 may include a hard disk drive (HDD). Memory unit 105 may include computer system readable media in the form of volatile memory, such as random access memory (RAM) and/or cache memory.

Data processing system 100 typically includes a variety of computer system readable media. Such media may be any available media that is accessible by data processing system 100, and it includes both volatile and non-volatile media, removable and non-removable media.

Data processing system 100 may also communicate with one or more external devices such as a keyboard, a pointing device, a display, etc.; one or more devices that enable a user to interact with data processing system 100; and/or any devices (e.g., network card, modem, etc.) that enable data processing system 100 to communicate with one or more other computing devices. Such communication can occur via I/O interface(s) 119. Still yet, data processing system 100 can communicate with one or more networks such as a local area network (LAN), a general wide area network (WAN), and/or a public network (e.g., the Internet) via network adapter 109. As depicted, network adapter 109 communicates with the other components of data processing system 100 via bus 107.

Processor 103 may comprise a central processing unit (CPU) 121 that communicates with memory management unit (MMU) 123. Processor 103 may further include a translation lookaside buffer (TLB) 125 that stores recently used address mappings in order to avoid accesses to page tables 127 in memory unit 105. MMU 123 includes address translation circuitry that performs address translation from a virtual page number to a physical page number wherein virtual addresses are translated to physical addresses.

Memory unit 105 may, for example, be provided in the form of read only memory (ROM) and RAM. A firmware 129 such as a basic input/output system (BIOS) may be stored in ROM. Software applications may also be stored in RAM. In one example, RAM component of the memory unit 105 may include operating system (OS) software 126.

In another example, the data processing system 100 may enable a virtualization environment, wherein memory unit 105 may include a hypervisor 130 (e.g. instead of OS 126), where the hypervisor 130 may operate as a real operating system (e.g. 126) which may run in kernel mode. The hypervisor 130 may run or controls one or virtual machines (or guest machines). The hypervisor 130 may use a page table such as page table 127 to convert a received guest address or virtual address of a requested data block to an absolute (or physical) address.

What is described below with reference to OS 126 holds true for the hypervisor 130. In particular, the method performed by the OS 126 in order to provide access to data blocks as described herein may also be performed by the hypervisor 130.

Data blocks 131A-N may be stored in storage system 111 and/or memory unit 105. For example, when a data block 131A is requested for access and that data block is not stored in the memory unit 105 a command is sent to the storage system 111 to provide the requested data block 131A. The storage system 111 may in response to the request send the requested data block to be stored in the memory unit 105 and may send an indication to the sender of the command (e.g. processor 103) that indicates that the requested data block is stored in the memory unit 105. As soon as loaded into the memory unit 105 the requested data block may be assigned a page table entry in the page table 127 in accordance with the present method.

The operation of the data processing system 100 will be described in details with reference to FIGS. 2-7.

Figure 2:
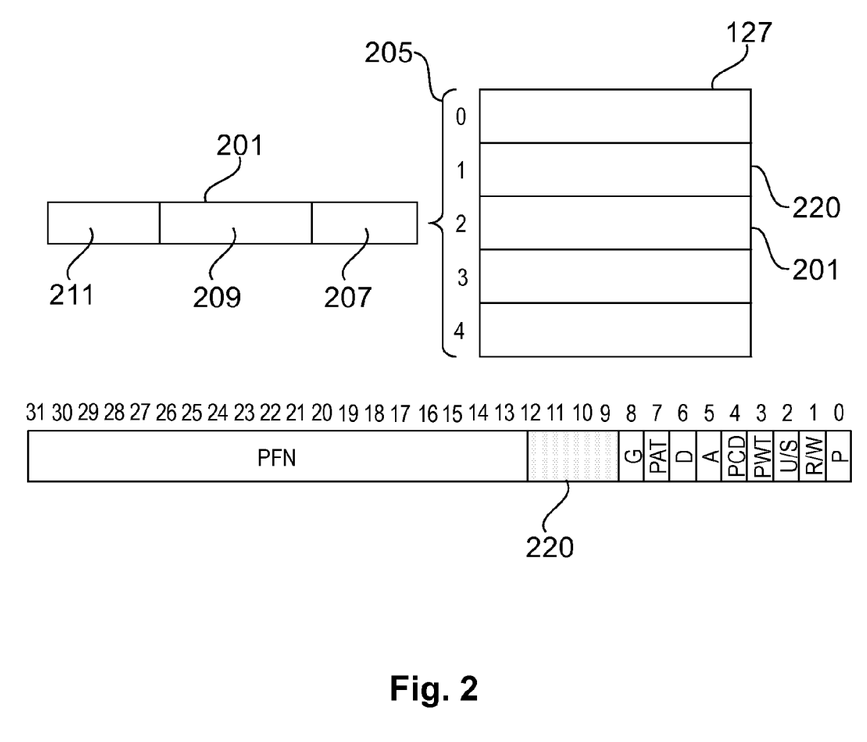
FIG. 2 illustrates an exemplary content of page table, according to an exemplary embodiment.

Referring now to FIG. 2, an illustration of content of page table 127 is provided, in accordance with an embodiment. FIG. 2 shows an example page table entry 201 of the page table 127 for a given data block of the data blocks 131A-N. For example, for each data block of at least part of the data blocks 131A-N, the OS 126 may be configured to create a respective page table entry having the structure of the page table entry 201. For example, the memory manager of the OS may be configured to add entries for every data block of the data blocks 131.

For example, the page table entry 201 may be created for a data block 131A that is requested or received in a predefined time period. The predefined time period may be a period during which a user of the data processing may require a faster access to that data block. In another example, the page table entry 201 may be created for a randomly selected data block of data blocks 131A-N. In a still further example, page table entry 201 may be created for every data block to be accessed in the memory unit 105. In yet another example, page table entry 201 may be created for a data block whose storage characteristics (or entry attributes as described above) can be fulfilled by the memory unit 105.

In contrast to conventional page table entries, the page table entry 201 is provided without indication of a physical address e.g. there is no indication of a physical frame number (PFN).

The page table entry 201 may comprise at least one field of one or more bits. The structure of the page table entry 201 may be newly determined (e.g. from scratch) or may be determined based on existing structures of page table entries as described below.

In one example, a first field 207 may indicate that the page table entry 201 is a valid or invalid entry. The first field 207 may comprise a 1-bit "valid bit". The valid bit may be set to either a "1" value to indicate a valid entry, or a "0" value to indicate an invalid entry. A second field 209 of the page table entry 201 may indicate that the page table entry 201 is a special entry in that it is different from other entries of the page table 127. The second field may comprise a 1-bit "special entry bit". The special entry bit may be set to "1" value to indicate that the entry is a special entry. This second field is particularly advantageous in case the page table 127 comprises page table entries such as page table entry 220 having different structure than the page table entry 201. A third field 211 of the page table entry 201 may indicate the one of the hardware and firmware component that is able to provide the physical address that corresponds to the page table entry 201. The third field 211 may comprise a 1-bit "HW/FW bit" to indicate the hardware or firmware component. The HW/FW bit may be set to either a "1" value to indicate hardware component, or a "0" value to indicate a firmware component. Fields 207-211 are shown as an example; however, the present method may provide the page table entry 201 with more or less three fields without an indication of a physical address.

In another example, the page table entry 201 may be generated based on the structure of existing page table entries. This may be done by, for example, zeroing bits that indicate the PFN in the existing structure. And, a bit of the existing structure may be reversed to indicate that the page table entry 201 is a special entry (e.g. for the system z architecture either bit in the range of bits 56-63 may be reversed). Further, a bit of the existing structure may be used to set values for indicating whether the entry is valid or not valid.

The present method may provide another structure for the added page table entries such as page table entry 220 for a data block 131B. For example, the page table entry 220 may have a structure according to the x86 architecture. Page table entry 220 may contain a present bit (P); a read/write bit (R/W) which determines if writes are allowed to this page; a user/supervisor bit (U/S) which determines if user-mode processes can access the page; a few bits (PWT, PCD, PAT, and G) that determine how hardware caching works for these pages; an accessed bit (A) and a dirty bit (D); and finally, the page frame number (PFN) itself. The page table entry 220 may be created for only part of the data blocks 131A-N. In one example, the page table entry 220 may not be created.

For example, each of the data blocks 131A and 131B may be accessed via a respective virtual address. And, the page table 127 may be searched to locate a page table entry (PTE) that corresponds to the requested virtual address. For that, an index may be generated e.g. by the MMU 123 from the virtual address in order to search among indices 205 of the page table 127 for the PTE that corresponds or represents the virtual address.

Figure 3:
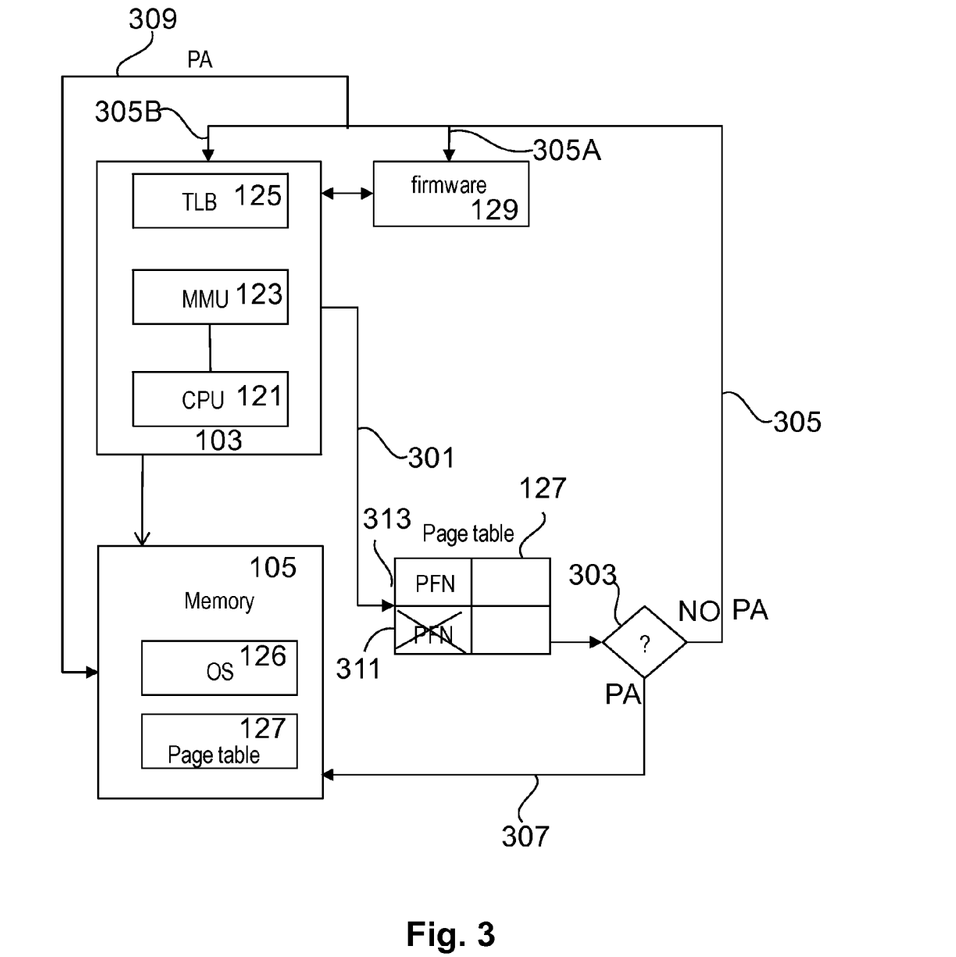
FIG. 3 illustrates an exemplary method for accessing a data block, according to an exemplary embodiment.

Referring now to FIG. 3, an illustration of an exemplary method for accessing a data block 131A that is stored in the memory unit 105. An access to the data block 131A may comprise a read and/or write access to the data block 131A.

MMU 123 may receive a request of a data block 131A via a virtual address. And in response to receiving the request, the MMU 123 may generate an index of the virtual address in order to access (301) the page table 127. Using the generated index, the MMU 123 may read the entry 311 or 313 that is indicated by the index in the page table 127 and may check if the read entry 311 or 313 has a structure of the page table entry 201 or not. For example, the MMU 123 may check (inquiry 303) if the reversed bit value is there in the read entry. In other words, the MMU 123 may check whether the read entry has an indication of a physical address (PA) e.g. PFN or not.

In case the entry being read 311 does not indicate a physical address (a cross sign in entry 311 illustrates that the PFN is not indicated in entry 311), the MMU 123 may obtain a physical address of the requested data block from one of the hardware 103 and firmware 129 components (305A-305B). For example, the one of the hardware 103 and firmware 129 components may be randomly selected. In another example, the read entry may indicate the one of the hardware 103 and firmware 129 components e.g. by reading the HW/FW bit that indicates that the one of the hardware 103 and firmware 129 components is able to provide a physical address for the requested data block.

The obtaining of the physical address may be performed by instructing by the MMU the one of the hardware 103 and firmware 129 components to provide the physical address. The MMU 123 may thus obtain the physical address from the one of the hardware 103 and firmware 129 components and may access (309) the data block using obtained physical address.

In case the entry being read 313 indicates a physical address the MMU 123 may use that indicated physical address to access (309) the requested data block.

Figure 4:
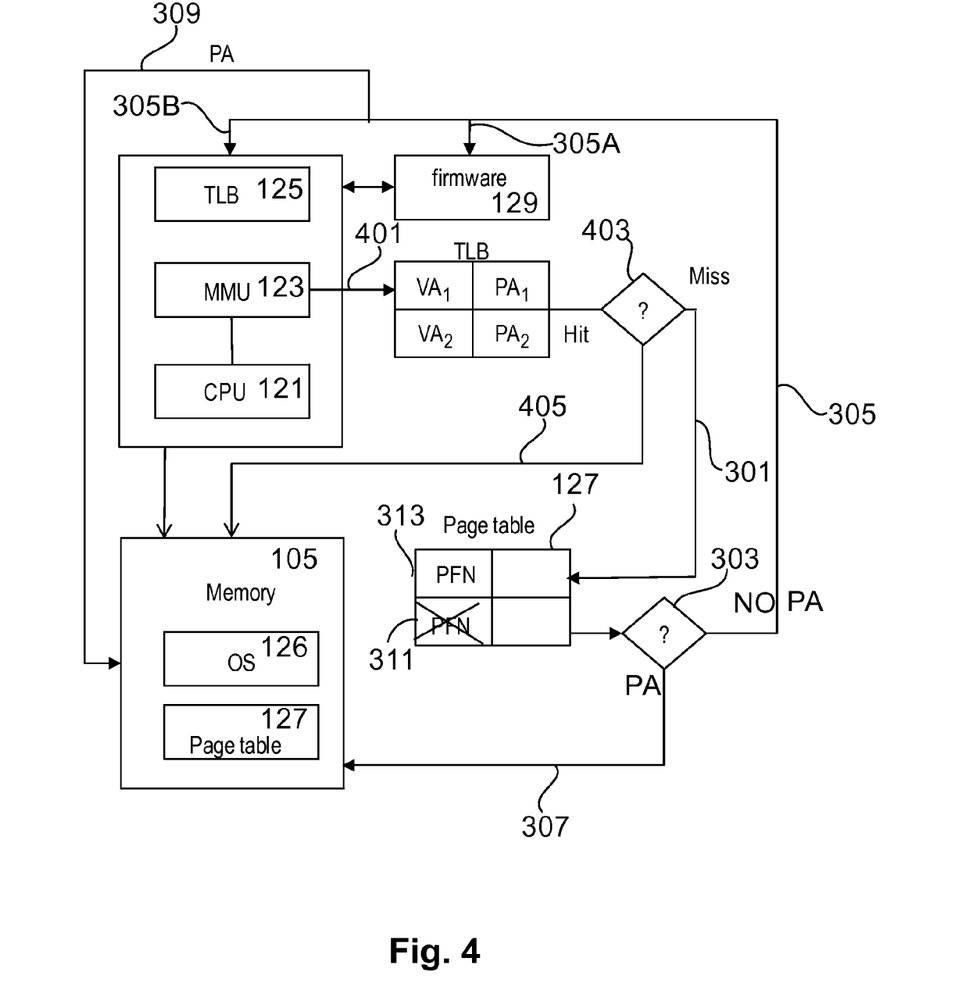
FIG. 4 illustrates another exemplary method for accessing a data block, according to an exemplary embodiment.

Referring now to FIG. 4, an illustration of an exemplary method for accessing a data block 131 that is stored in the memory unit 105.

MMU 123 may receive a request of a data block 131A via a virtual address. And in response to receiving the request, the MMU 123 may access (401) the TLB 125 for determining whether (inquiry 403) there is an entry in the TLB 125 that comprises the requested virtual address.

In case of a TLB hit (403) i.e. the requested virtual address is comprised in the TLB 125, the MMU 123 may use the physical address that is associated with the requested virtual address in the TLB 125 in order to access (405) the requested data block 131A in the memory unit 105.

In case of a TLB miss i.e. the requested virtual address is not in the TLB 125, the method steps 301-309 as described with reference to FIG. 3 may be performed. In this case, the one of the hardware and firmware components may create an entry in the TLB 125 indicating the requested virtual address and the associated physical address. The MMU 123 will then read the TLB 125 to get the physical address and access (309) the requested data block in the memory unit 105.

Figure 5:
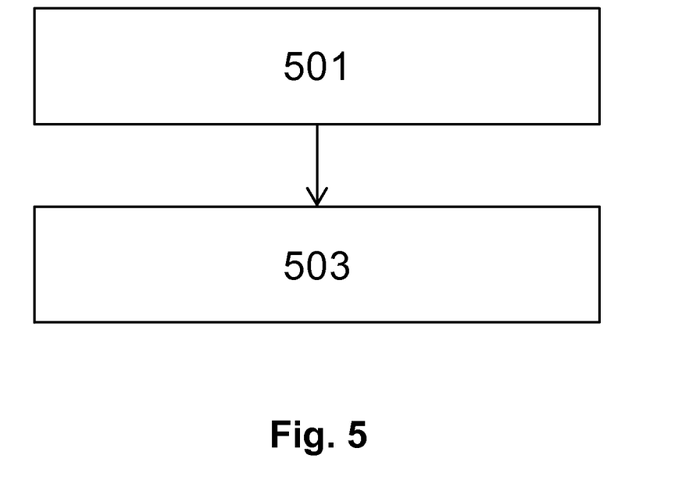
FIG. 5 is a flowchart of an exemplary method for creating or adding an entry in the page table, according to an exemplary embodiment.

Referring now to FIG. 5, a flowchart of an exemplary method for creating or adding an entry in the page table 127 is provided, according to an exemplary embodiment. For example, the OS 126 may receive a request to access data block 131C via a virtual address of the data block 131C. The data block 131C being stored in the storage system 111 is loaded in the memory unit 105 and before creating an entry in the page table 127 as described with reference to FIG. 2, the OS 126 may negotiate the content (e.g. values of bits) of the entry to be added. For that, in step 501, the OS 126 may send a request to the hardware 103 and/or firmware 129 component. The request indicates storage characteristics or entry attributes of the data block 131C. The entry attributes may comprise added entry is a valid or invalid entry; an indication of the one of the hardware and firmware components; a read only flag for the data block; storage technology for storing the data block, copy on write option, read/write/execute permissions, locking in the memory unit 105. In case, the OS 126 comprises a Linux OS the mmap system may be modeled so as to enable this negotiation method. For example, the request may be sent as a mmap instruction, CreateFileMapping function of MS Windows, an AIX mmap instruction, zOS unix system services mmap etc.) For example, the OS 126 provides an mmap call for establishing mappings from an input address space/the virtual address of the data block 131C to a portion of the memory unit 105 associated with the data block 131C, and assigning certain attributes (of the entry attributes) to the page or entry to be added or created. Those attributes describe at least the requested storage characteristics.

In step 503, the OS 126 may add the entry if the OS 126 receives an acknowledgment from the hardware 103 or firmware 129 component. The acknowledgment may indicate values for one or more bits of the added entry that indicate each of the requested storage characteristics.

Figure 6:
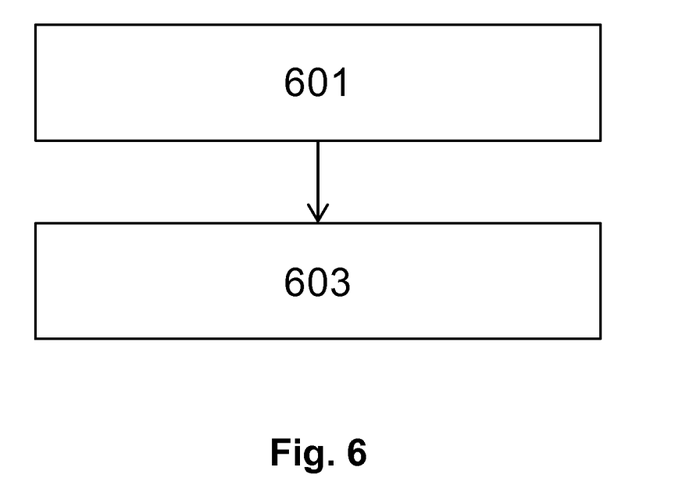
FIG. 6 is a flowchart of another exemplary method for creating or adding an entry in the page table, according to an exemplary embodiment.

Referring now to FIG. 6, a flowchart of another exemplary method for creating or adding an entry in the page table 127 is provided. For example, the OS 126 may receive a request to access data block 131C. The data block 131C being stored in the storage system 111 is loaded in the memory unit 105 and before creating an entry in the page table as described with reference to FIG. 2, the OS 126 may negotiate the content (e.g. values of bits) of the entry to be added. For that, in step 601, the OS 126 may register with the hardware 103 and/or firmware 129 components the entry to be added, wherein the registration indicates storage characteristics of the data block 131C. The registering comprises defining or suggesting by the OS 126 values of one or more bits of the entry to be added. Such values are indicative or reference to the requested storage characteristics. In case of the OS 126 comprises a Linux OS the mmap system may be modeled so as to enable this negotiation method. For example, the request may be sent as a mmap instruction.

In step 603, the OS 126 may add the entry if the OS 126 receives a confirmation from the hardware 103 or firmware 129 components of the suggested values and associated storage characteristics.

Figure 7:
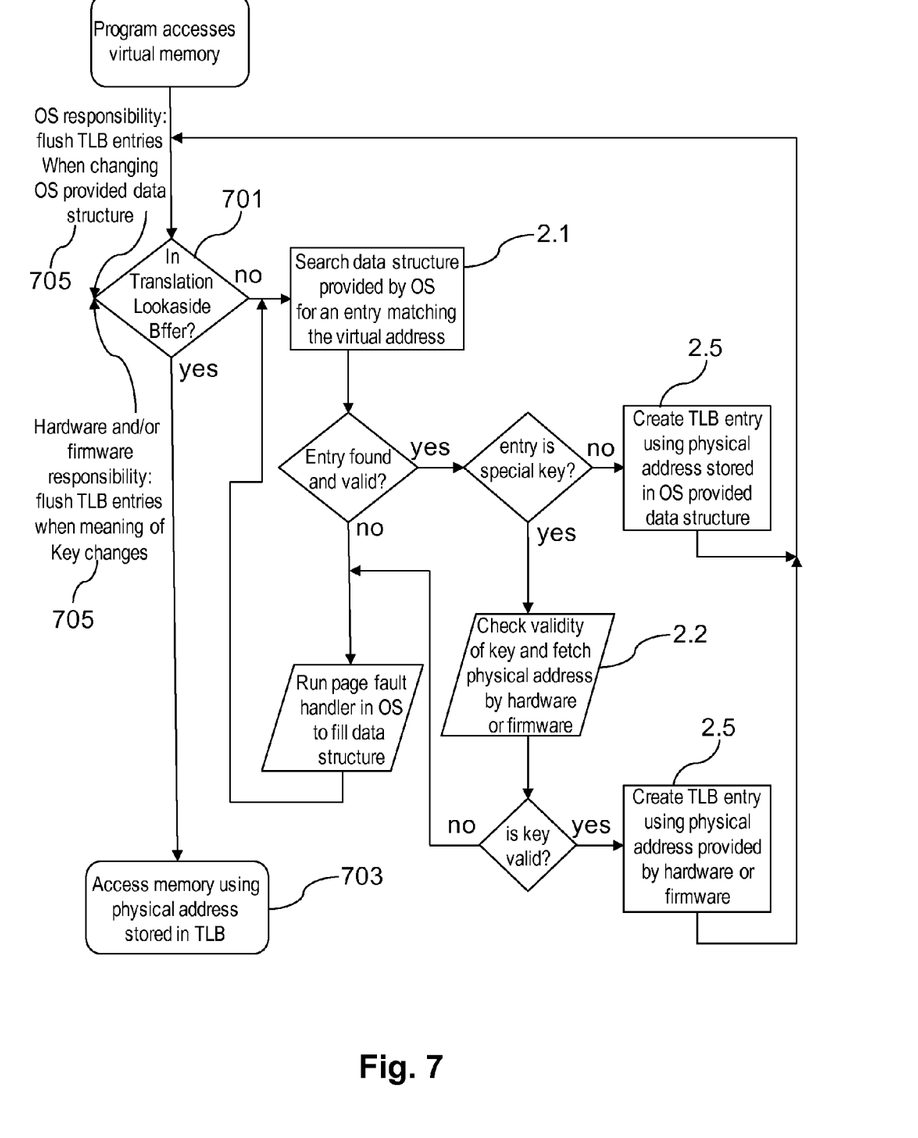
FIG. 7 depicts a flow diagram of an exemplary method for accessing data blocks, according to an exemplary embodiment.

Referring now to FIG. 7, a flow diagram of an exemplary method for accessing data blocks e.g. 131A-N, is provided, according to an exemplary embodiment. The MMU 123 may receive a request for accessing a data block 131N via a virtual address of the data block 131N.

1. Virtual Memory Access Via TLB

In this step 1, the MMU 123 may be configured to resolve the virtual address of the data block 131N into physical or guest absolute address is attempted as follows:

The virtual address is split into virtual page frame number and intra-page offset.

The virtual page frame number is being looked up 701 in the TLB 125. For that, an address space identifier may be used alongside the virtual address, which enables the TLB 125 to contain translations for multiple virtual address spaces at the same time. If an entry is found, the physical or guest absolute page frame number can be retrieved from the entry. Otherwise, the MMU 123 attempts creation of an entry in the TLB 125 (see step 2).

If an entry was found, the physical or guest absolute address is generated from adding the physical or guest absolute page frame number and the intra-page offset.

The memory access 703 to the requested data block 131N is performed by the MMU 123 using the physical or guest absolute address.

2. Creation of an Entry in the TLB 125

For this step 2, a page table e.g. 127 may be used. The page table 127 data structure may be implemented by a partially populated table with multiple stages. It may be provided by the operating system's memory manager of the OS 126, and is used by the MMU 123 to look up a page table entry that matches the virtual address.

The MMU 123 attempts creation of an entry in the TLB 125 as follows:

2.1) The MMU 123 traverses the page table 127 in order to find the entry that corresponds with the virtual frame number to be resolved. If no valid entry can be found, the operating system's page fault handler of OS 129 is being called. The OS 129 creates the corresponding entry (e.g. as described with reference to FIG. 2), and then the memory access is retried: see Step 1. In error cases, where the OS 126 cannot create the corresponding entry, an error path is taken such as injection of a segmentation violation signal.

2.2) If the page table entry is an I/O key (the I/O key refers to the entry e.g. 201 that has no indication of the physical address as described above), hardware or firmware is invoked. It checks the validity of the I/O key and provides the corresponding physical or guest absolute page frame number. This process may include evacuating previous use of a physical or guest absolute area and moving subject data into the physical or guest absolute memory. This process may as well provide a physical or guest absolute address that is not backed by physical memory e.g. the memory unit 105.

2.3) Instead, memory accesses are given to I/O hardware before or after they have been cached in the processor's memory cache hierarchy. Multiple I/O key characteristics can be mixed in the preferred implementation, depending on the workload and use case of subject I/O or memory region. In this case, step 2.4 is done next.

2.4) If the page table entry is not an I/O key e.g. 220, 313, the physical or guest absolute page frame number provided in the page table entry is being used.

2.5) A TLB entry is created using the virtual frame number and the physical or guest absolute frame number gathered in either step 2.2 or 2.4. After that, the memory access is retried, see Step 1.

3. I/O Key Negotiation

In this step, the content of the I/O key or entry is performed as follows:

In the preferred implementation, OS 126 requests the assignment of an I/O key with specified characteristics such as requested storage technology for backing, I/O characteristics, caching, and more. Hardware/firmware (e.g. 103/129) checks if it can fulfill the request according to the limits of the implementation and the settings for the calling operating system image. It returns a valid I/O key in case of success.

In an alternate implementation, the OS 126 generates an I/O key, and registers it with hardware/firmware. Alongside the request, it can set characteristics such as requested storage technology for backing, I/O characteristics, caching, and more. In return, hardware/firmware indicates success or failure of the registration.

In case an I/O key is not used any longer, the OS 126 signals the deregistration of subject I/O key to hardware/firmware. The corresponding translation lookaside buffer entries are being flushed by either the OS 126, hardware 103 or firmware 127.

4. Flushing the TLB 705

In the implementation with I/O key support, for some pages the OS 126 is only responsible for mapping the virtual address to I/O keys. For these pages, the hardware/firmware is responsible for mapping of the I/O keys to physical addresses, or in cooperation with the hypervisor to guest absolute addresses. Correspondingly, the OS 126 needs to flush invalid translations from the TLB 125 every time it changes the relation from a virtual page frame to an I/O key, physical or guest absolute address. In addition, hardware/firmware are responsible for flushing invalid translations from the TLB every time it changes the I/O key to physical, or guest absolute addresses.

Possible combination of features described above can be the following:

A method for accessing data blocks stored in a computer system, where the computer system includes hardware and firmware components for controlling access to a memory unit. The memory unit includes a page table and an operation system or a hypervisor, where each data block is accessed via a virtual address. The data blocks add an entry in the page table that represents the virtual address of the data block. A request is received including a first data block via a first virtual address by a memory management unit (MMU) of the computer system. The first data block is checked to match the first virtual address. A first physical address of the first data block from one of the hardware and firmware components is obtained, where the added entry is provided without indication of the first physical address.

The page table can also include entries indicating physical addresses of a second set of data blocks as well as marking each of the added entries as an entry having no indication of a physical address.

Added entries indicated at least one of the following: the added entry is a valid or invalid entry, one of the hardware and firmware components, a read only data block, or storage characteristics for storing the data block.

Adding the entry may also include: sending a request to the hardware and/or firmware component indicating storage characteristics and/or adding the entry upon receiving an acknowledgment from the hardware or firmware component, where the added entry include information provided by the sender of the acknowledgment.

The adding of the entry may also include: registering the entry to be added, where the registration indicates storage characteristics of the respective data block and adding the entry upon receiving a confirmation from the hardware or firmware component.

The added entry may also include the added entry information indicating the entry as a valid or invalid entry, where the obtaining of the first physical address is performed if the first entry is a valid entry.

The added entry may also include information indicating hardware or firmware components, where the obtaining of the first physical address includes reading the information for determining which of the hardware and firmware components from which the first physical address is to be obtained.

A translation lookaside buffer (TLB) may also be used, where the receiving of the request also includes detecting a TLB miss for the requested first virtual address.

Obtaining the first physical address may also include: instructions by the MMU to provide the first physical address and/or creating an entry in the TLB indicating the first virtual address and the first physical address by the one of the hardware and firmware components.

If a given entry of the added entries is at least recently used (LRU) entry, unregistering the given entry using the one of the hardware and firmware components.

There may also be a determination of usage frequency of a given entry of the added entries, in case the usage frequency is smaller than a predefine threshold unregistering the given entry using the one of the hardware and firmware components.

The unregistering includes flushing the TLB by the one of the hardware and firmware components or the operating system.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for accessing data blocks stored in a computer system, the computer program product comprising:
　one or more computer-readable storage media and program instructions stored on the one or more computer-readable storage media, the program instructions comprising:
　　program instructions to receive, by a memory management unit of the computer system, a request to access a virtual address;
　　program instructions to translate, by the memory management unit of the computer system, the virtual address to a physical storage system address of a data block on a storage system;
　　program instructions to retrieve, by the memory management unit of the computer system, the data block from the storage system at the physical storage system address;
　　program instructions to load, by the memory management unit of the computer system, the retrieved data block into a memory of the computer system at a physical memory address;
　　in response to determining, by the computer system, that a predetermined criteria is met:
　　　program instructions to create, by the memory management unit of the computer system, a special page table entry in a page table corresponding to the virtual address;
　　　program instructions to translate, by one of a hardware component and firmware component of the computer system, the virtual address to the physical memory address corresponding to the location in the memory of the computer system into which the retrieved data block was loaded, wherein the physical memory address is not stored in the special page table entry;
　　　program instructions to create, by the memory management unit of the computer system, an entry in a translation lookaside buffer corresponding to the virtual address, wherein the entry includes the physical memory address;
　　in response to determining, by the computer system, that the predetermined criteria is not met:
　　　program instructions to create, by the memory management unit of the computer system, a legacy page table entry in the page table corresponding to the virtual address;
　　　program instructions to translate, by an operating system or hypervisor of the computer system, the virtual address to the physical memory address;
　　　program instructions to store, by the memory management unit of the computer system, the physical memory address in the legacy page table entry; and
　　　program instructions to create, by the memory management unit of the computer system, an entry in the translation lookaside buffer corresponding to the virtual address using the physical memory address stored in the legacy page table entry, wherein the entry includes the physical memory address.

2. The computer program product of claim 1, wherein the special page table entry indicates one or more of:

the entry as valid or invalid;
the one of the hardware and firmware components;
the data block as read only; and
the storage characteristics for storing the data block, the storage characteristics includes one or more of:
storage technology for storing the data block;
copy on write;
read/write/execute permissions; and
locking in the memory unit.

3. The computer program product of claim 1, wherein the program instructions to create the special page table entry comprise:
program instructions to send a request, by the operating system, to the hardware or firmware component indicating storage characteristics of the respective data block; and
program instructions to create the entry upon receiving an acknowledgement from the hardware or firmware component, wherein the created entry includes information provided by a sender of the acknowledgement.

4. The computer program product of claim 1, wherein the program instructions to create the special page table entry comprise:
program instructions to register the entry to be created, by the operating system with the hardware or firmware components, wherein the registration indicates storage characteristics of the respective data block; and
program instructions to create the entry upon receiving a confirmation from the hardware or firmware component.

5. The computer program product of claim 1, wherein the special page table entry includes information indicating the entry as a valid or invalid entry, and wherein the translating of the virtual address to the physical memory address is performed if the entry is a valid entry.

6. The computer program product of claim 5, wherein if the special page table entry is an invalid entry, further comprising:
program instructions to control a page fault handler of the operating system to fill the page table with a new entry or to mark the entry as a valid entry.

7. The computer program product of claim 1, further comprising:
program instructions to unregister the special page table entry using the one of the hardware and firmware components, in response to determining that the entry is a least recently used (LRU) entry.

8. A computer system for accessing data blocks stored in a computer system, the computer system comprising:
one or more computer processors, one or more computer-readable storage media, and program instructions stored on one or more of the computer-readable storage media for execution by at least one of the one or more processors, the program instructions, when executed by the at least one of the one or more processors, causing the computer system to perform a method comprising:
receiving, by a memory management unit of the computer system, a request to access a virtual address;
translating, by the memory management unit of the computer system, the virtual address to a physical storage system address of a data block on a storage system;
retrieving, by the memory management unit of the computer system, the data block from the storage system at the physical storage system address;
loading, by the memory management unit of the computer system, the retrieved data block into a memory of the computer system at a physical memory address;
in response to determining, by the computer system, that a predetermined criteria is met:
creating, by the memory management unit of the computer system, a special page table entry in a page table corresponding to the virtual address;
translating, by one of a hardware component and firmware component of the computer system, the virtual address to the physical memory address corresponding to the location in the memory of the computer system into which the retrieved data block was loaded, wherein the physical memory address is not stored in the special page table entry;
creating, by the memory management unit of the computer system, an entry in a translation lookaside buffer corresponding to the virtual address, wherein the entry includes the physical memory address;
in response to determining, by the computer system, that the predetermined criteria is not met:
creating, by the memory management unit of the computer system, a legacy page table entry in the page table corresponding to the virtual address;
translating, by an operating system or hypervisor of the computer system, the virtual address to the physical memory address;
storing, by the memory management unit of the computer system, the physical memory address in the legacy page table entry; and
creating, by the memory management unit of the computer system, an entry in the translation lookaside buffer corresponding to the virtual address using the physical memory address stored in the legacy page table entry, wherein the entry includes the physical memory address.

9. The computer system of claim 8, wherein the special page table entry indicates one or more of:
the entry as valid or invalid;
the one of the hardware and firmware components;
the data block as read only; and
the storage characteristics for storing the data block, the storage characteristics includes one or more of:
storage technology for storing the data block;
copy on write;
read/write/execute permissions; and
locking in the memory unit.

10. The computer system of claim 8, wherein creating the special page table entry comprises:
sending a request, by the operating system, to the hardware or firmware component indicating storage characteristics of the respective data block; and
creating the entry upon receiving an acknowledgement from the hardware or firmware component, wherein the created entry includes information provided by a sender of the acknowledgement.

11. The computer system of claim 8, wherein creating the special page table entry comprises:
registering the entry to be created, by the operating system with the hardware or firmware components, wherein the registration indicates storage characteristics of the respective data block; and
creating the entry upon receiving a confirmation from the hardware or firmware component.

12. The computer system of claim 8, wherein the special page table entry includes information indicating the entry as a valid or invalid entry, and wherein the translating of the virtual address to the physical memory address is performed if the entry is a valid entry.

13. The computer system of claim 8, further comprising:
  unregistering the special page table entry using the one of the hardware and firmware components, in response to determining that the entry is a least recently used (LRU) entry.

* * * * *